US007507492B2

(12) United States Patent
Kweon

(10) Patent No.: US 7,507,492 B2
(45) Date of Patent: Mar. 24, 2009

(54) ELECTRONIC DEVICE HAVING FUEL CELL SYSTEM

(75) Inventor: Ho-Jin Kweon, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/514,910

(22) Filed: Sep. 5, 2006

(65) Prior Publication Data

US 2007/0059578 A1 Mar. 15, 2007

(51) Int. Cl.
*H01M 8/02* (2006.01)
*H01M 8/10* (2006.01)

(52) U.S. Cl. .......................................... 429/34; 429/30

(58) Field of Classification Search ..................... 429/9, 429/13, 22, 25, 30, 34

See application file for complete search history.

(56) References Cited

U.S. PATENT DOCUMENTS 6,628,506 B2 * 9/2003 Landry et al. ............... 361/680
7,158,375 B2 * 1/2007 Kornmayer ............... 429/34 X
2004/0170876 A1 * 9/2004 Ozeki .......................... 429/22
2006/0008688 A1 * 1/2006 Kamo et al. .................. 429/25

* cited by examiner

*Primary Examiner*—Stephen J. Kalafut
(74) *Attorney, Agent, or Firm*—Robert E. Bushnell, Esq.

(57) ABSTRACT

There is provided an electronic device including an electronic device main body and a fuel cell main body which has an electricity generator for generating electrical energy and is rotated with respect to the electronic device main body. The electricity generator includes first and second electrode layers and an electrolyte membrane interposed between the first and second electrode layers, an anode portion corresponding to the first electrode layer, and a cathode portion corresponding to the second electrode layer.

20 Claims, 10 Drawing Sheets

100
30
45a
45
60
90
10
20
23a
23
40
41
50
43

400
320(321)
326
327
345(346)
341(344)
365(366)
361(364)
380
381
371
370
360
350
340
330
321b
322(322a)
321a
322(322b)
351
353
352

ELECTRONIC DEVICE HAVING FUEL CELL SYSTEM

BACKGROUND OF THE INVENTION (a) Field of the Invention

The present invention relates to a fuel cell system, and more particularly, to a fuel cell system capable of being used as a power source of an electronic device. In addition, the present invention relates to an electronic device having a fuel cell system.

(b) Description of the Related Art

As well known, the fuel cell is an electricity generating system for directly converting chemical reaction energy hydrogen contained in a fuel and oxygen which is provided separately from the fuel into electrical energy.

The fuel cell is classified into various types of fuel cells according to components constructing a system or types of a fuel. Among these, a monopolar fuel cell is constructed with a plurality of unit cells which are two-dimensionally disposed, and provides a fuel and oxygen to the unit cells in order to generate electrical energy.

However, the monopolar fuel cell which has been known is supplied with oxygen through a one side of a fuel cell main body constructed with the unit cells, so that the oxygen is not properly supplied to the unit cells according to a circumstance of a user. Therefore, there is a problem in that an output expected from the unit cells is not maximized.

In addition, the monopolar fuel cell is supplied with oxygen through only the one side of the fuel cell main body as described above, so that it is difficult to properly cool the unit cell which emits heat. Therefore, the reliability of a performance of the fuel cell and the safety of the user decreases.

Recently, lightweight, compact, and high-tech electronic devices such as a telecommunication mobile terminal, a portable multimedia player (PMP), a playstation portable (PSP), and a personal digital assistants (PDA) have been rapidly developed.

As a power source of the electronic device, a rechargeable battery is generally used. However, the existing rechargeable battery has a problem in that the rechargeable battery cannot cope with the high power consumption of the electronic devices.

Therefore, in the fuel cell art, a fuel cell system which can maximize an output of electrical energy and can be easily used and carried with the electronic device is required.

SUMMARY OF THE INVENTION

In order to solve the aforementioned problem, the present invention provides an electronic device capable of maximizing an output of electrical energy generated by a fuel cell which is included in the electronic device and using the electrical energy as a main power source.

According to an aspect of the present invention, there is provided an electronic device including an electronic device main body; and a fuel cell main body which has an electricity generator for generating electrical energy and is rotated with respect to the electronic device main body.

According to another aspect of the present invention, there is provided an electronic device including an electronic device main body and a fuel cell main body which has an electricity generator for generating electrical energy and is rotated with respect to the electronic device main body In addition, the electricity generator includes first and second electrode layers and an electrolyte membrane interposed between the first and second electrode layers an anode portion corresponding to the first electrode layer and a cathode portion corresponding to the second electrode layer.

The electronic device main body may include a mount member.

The mount member may be integrated into the electronic device main body in one body.

The mount member may be separable from the electronic device main body.

The electronic device may further include a hinge portion by which the fuel cell main body is hinged to the electronic main body.

The electronic device may further include a fuel tank which is disposed in the mount member and stores a fuel.

The mount member may include an accommodating portion for accommodating the fuel tank.

The fuel tank may be detachable from the accommodating portion.

The electronic device may further include a fuel pump which is disposed in the mount member in order to supply the fuel stored in the fuel tank to the electricity generator.

The fuel cell main body has a shape of a substantially rectangular flat board.

The electronic generator may include one or more pairs of membrane-electrode assembly (MEAs) with a medium member between the pair of MEAs. In addition, the MEA may include an anode, an electrolyte membrane, a cathode which are sequentially disposed from the medium member.

The fuel cell main body may include a case which is provided with a plurality of air vents and accommodates the electricity generator.

The case may accommodate a pair of the electricity generators facing each other.

The cathode of the electricity generator may be disposed in the case to face a one side of the case.

DETAILED DESCRIPTION OF THE EMBODIMENTS

Hereinafter, exemplary embodiments of the present invention will be described in detail with reference to the attached drawings such that the present invention can be easily put into practice by those skilled in the art. However, the present invention is not limited to the exemplary embodiments, but may be embodied in various forms.

Figure 1:
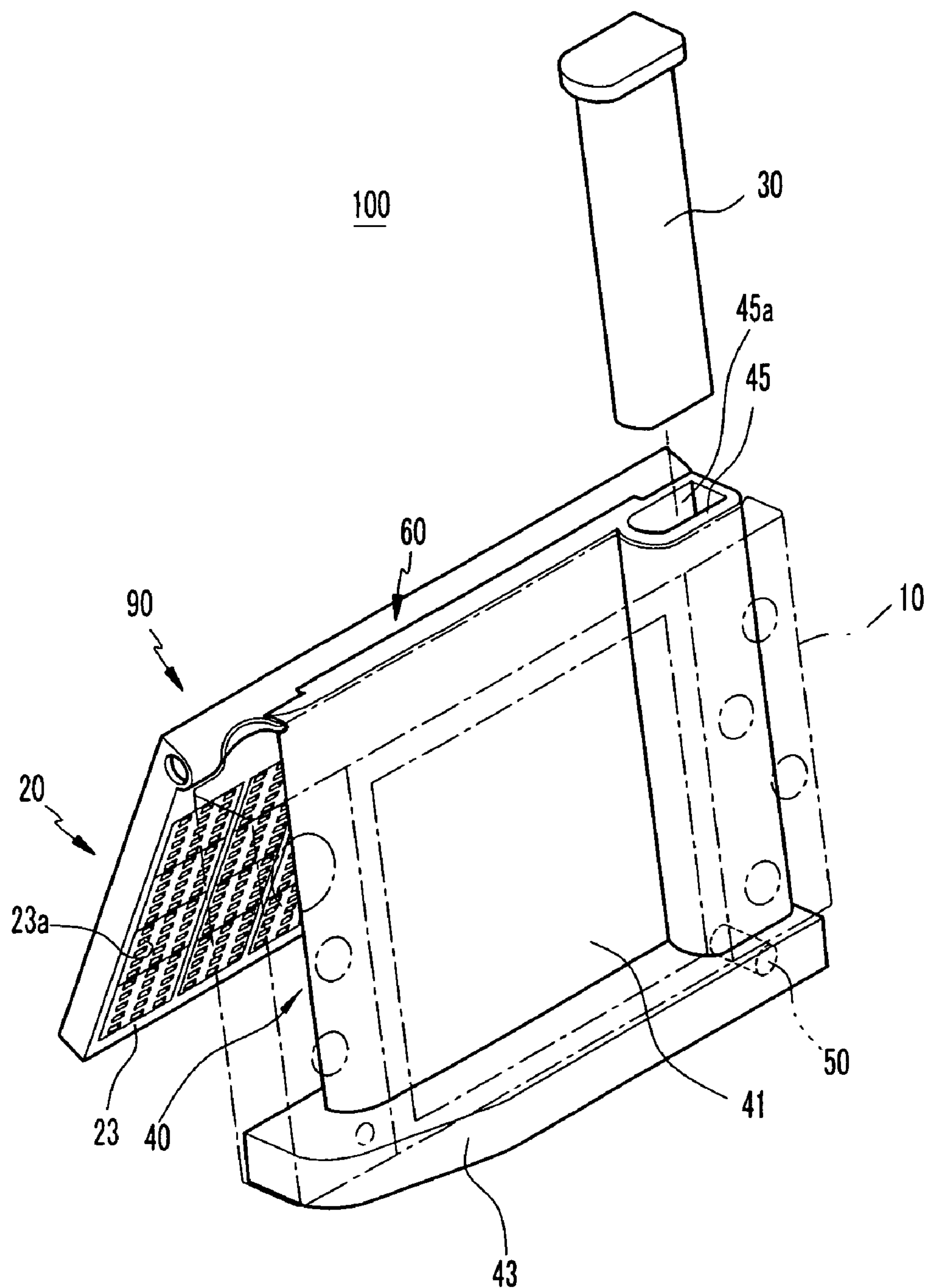
FIG. 1 is a partially exploded perspective view showing an electronic device according to a first embodiment of the present invention.
Figure 2:
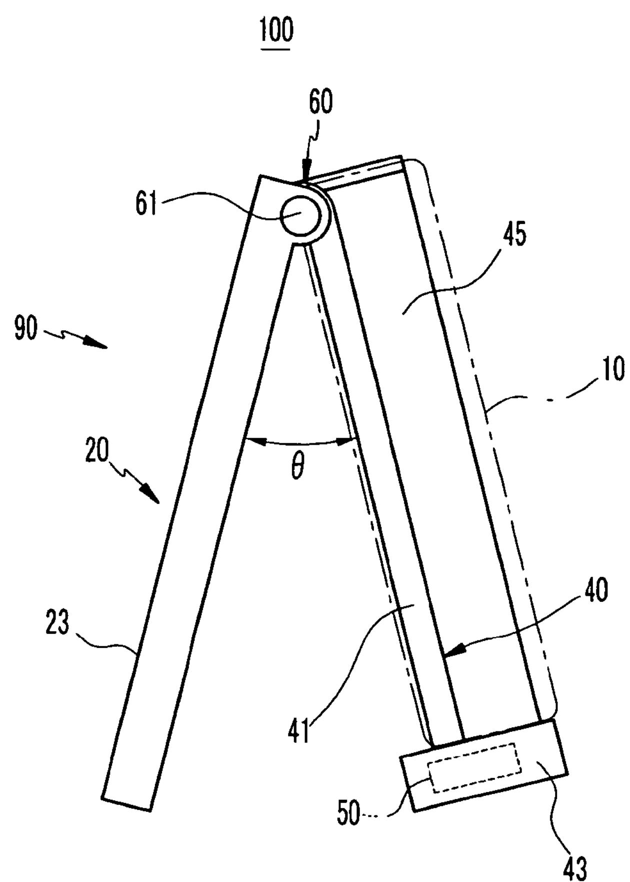
FIG. 2 is a side view showing the electronic device shown in FIG. 1.

FIG. 1 is a perspective view showing an electronic device according to a first embodiment of the present invention. FIG. 2 is a side view showing the electronic device shown in FIG. 1.

An electronic device 100 according to a first embodiment of the present invention is described with reference to FIGS. 1 and 2. The electronic device 100 is a multimedia device which has a small size so as to be portable and can watch moving images and information and execute games.

As examples of the electronic device 100, there are a portable multimedia player (PMP), a playstation portable (PSP), a personal digital assistants (PDA), an MPEG audio layer-3 (MP3), and a telecommunication mobile terminal.

In the current embodiment, the electronic device 100 does not employ a rechargeable battery, but the electronic device 100 employs a fuel cell for generating electrical energy using a fuel so as to be supplied with a power source needed for driving the electronic device 100.

In the current embodiment, the electronic device 100 includes an electronic device main body 10 and a fuel cell system 90 which is constructed to fix to the electronic device 10. Here, the fuel cell system 90 may employ a direct methanol fuel cell (DMFC) scheme in which the fuel cell system 90 is directly supplied with a liquid fuel such as methanol and ethanol is and generates electrical energy by an oxidation reaction of hydrogen contained in the liquid fuel and a reduction reaction of oxygen contained in air.

The fuel cell system 90 includes a fuel cell main body 20. The electronic device 100 includes a mount member 40 which loads the electronic main body 10 thereon and a hinge portion 60 by which the fuel cell main body 20 is hinged to the mount member 40.

In the current embodiment, the fuel cell system 90 is constructed to directly supply the electrical energy to the electronic main body 10 as a main power source.

Figure 3:
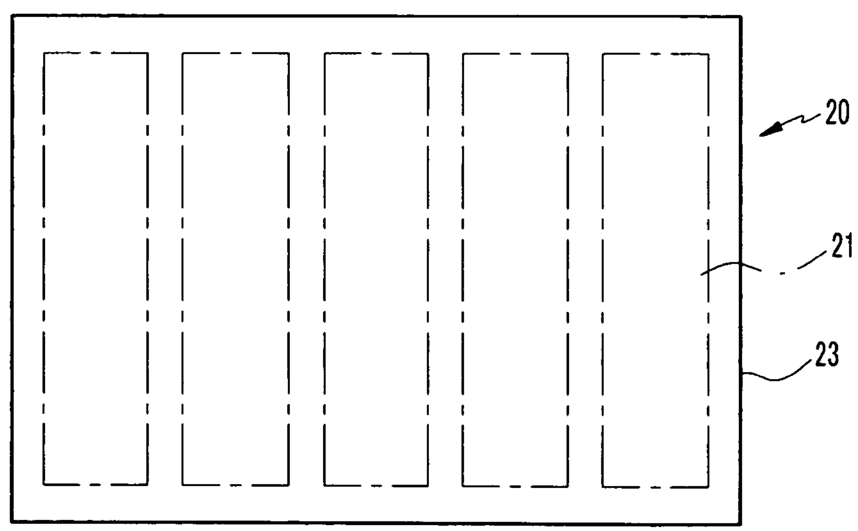
FIG. 3 is a front view schematically showing a fuel cell main body according to a first embodiment of the present invention.

FIG. 3 is a front view schematically showing a structure of a fuel cell main body 20 shown in FIG. 1. Referring to FIG. 3, the fuel cell main body 20 has a shape of a substantially rectangular flat board and includes a plurality of electricity generators 21 for generating electrical energy by a reaction of air and a fuel.

In the current embodiment, the electricity generators 21 are sequentially disposed in a two-dimensional direction to both sides of the fuel cell main body 20 in a case 23. A pair of the electricity generators 21 may be symmetrically disposed facing each other in a direction of a thickness of the fuel cell main body 20.

Figure 4:
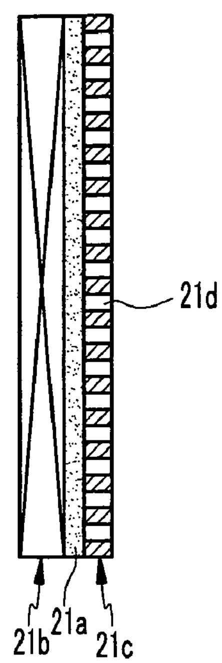
FIG. 4 is a sectional view schematically showing an electricity generator included in a fuel cell main body according to a first embodiment of the present invention.
Figure 5:
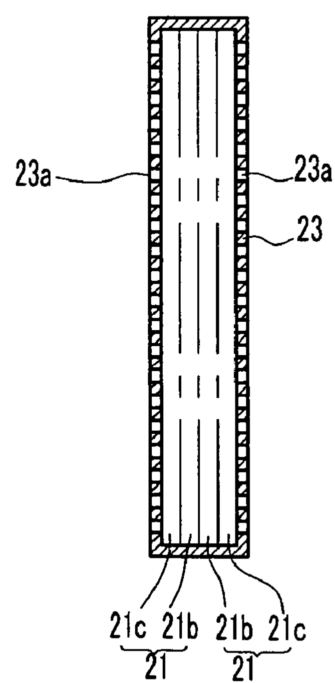
FIG. 5 is a side sectional view schematically showing the fuel cell main body shown in FIG. 3.

FIG. 4 is a sectional view schematically showing a structure of the electricity generator 21 shown in FIG. 3. Referring to FIG. 4, the electricity generator 21 constitutes a minimum unit of fuel cell for generating electrical energy by a reaction of a fuel and air.

The electricity generator 21 includes a membrane-electrode assembly (MEA) 21*a*, an anode portion 21*b* disposed at a side of the MEA 21*a*, and a cathode portion 21*c* disposed at the other side of the MEA 21*a*.

A first electrode layer is formed on the side of the MEA 21*a*, a second electrode layer is formed on the other side thereof, and an electrolyte membrane is formed between the both electrode layers, thereby constituting a general MEA. In this case, in the first electrode layer, hydrogen contained in the fuel is decomposed into electrons and hydrogen ions, the electrolyte membrane moves the hydrogen ions to the second electrode layer, and the second electrode layer allows the electrons and hydrogen ions supplied from the first electrode layer to react with oxygen in air so as is to generate water and heat.

The anode portion 21*b* has a function of distributing the fuel to the first electrode layer. The anode portion 21*b* includes a fuel pathway (not shown) through which the fuel flows and is disposed in close contact with the first electrode layer of the MEA 21*a*.

The cathode portion 21*c* has a function of distributing air to the second electrode layer of the MEA 21*a*. The cathode portion 21*c* has a plurality of holes 21*d* such that the air in the atmosphere is circulated by convection and diffusion so as to be supplied to the second electrode layer of the MEA 21*a*, and is disposed in close contact with the second electrode layer. Therefore, the cathode portion 21*c* is exposed to the outside through the both sides of the fuel cell main body 20.

In order to expose the electricity generators 21 and the cathode portion 21*c* to the outside through the both sides of the fuel cell main body 20 as described above, the fuel cell main body 20 according to the current embodiment includes a plurality of air vents 23*a* at the both sides thereof and a case 23 accommodating the electricity generators 21.

The case 23 has a shape of a substantially rectangular parallelepiped forming an accommodating space for accommodating the electricity generators 21, and as shown in the figure, the air vents 23*a* at the both sides are formed to correspond to the holes 21*d* shown in FIG. 4 of the cathode portion 21*c*.

Therefore, the electricity generators 21 are disposed to allow the cathode portions 21*c* to face the both inner sides of the case 23, so that the air vents 23*a* of the case 23 are connected to the holes 21*d* of the cathode portions 21*c* in a one to one manner.

Alternatively, as an example of connection relations between the holes of the cathode portion and the air vents of the case, the air vents of the case may be formed to correspond to the entire size of the electricity generator in a many to one manner.

According to the structure, the air in the atmosphere is supplied to the second electrode layer of the MEA 21*a* by convection or diffusion through the air vents 23*a* of the case 23 and the holes 21*d* of the cathode portion 21*c*.

In addition, while the anode and cathode portions 21*b* and 21*c* have functions of supplying the fuel and the air to the first and second electrode layers, respectively, the anode and cathode portions 21 and 21*c* have functions as conductors for connecting the first and second electrode layers in series.

In the present invention, when the electricity generators are accommodated into the case, the electricity generators are disposed to allow the cathode portions to face the both inner sides of the case as described above. Alternatively, the cathode and anode portions are disposed to face the both inner sides of the case.

In the current embodiment, as shown in FIGS. 1 and 2, the electron device main body 10 is practically mounted to the mount member 40. In addition, the fuel cell main body 20 is hinged to the mount member 40 by a hinge portion 60 which will be described later.

The mount member 40 may be constructed to be integrated into a package forming an outer appearance of the electronic device main body 10 in one body by a conventional tightening member, or may be constructed to be selectively detachable from the package of the electronic device main body 10.

In the current embodiment, the mount member 40 is constructed with a base plate 41 which is practically engaged with the back of the electronic device main body 10 and a supporting block 43 for supporting a lower portion of the electronic device main body 10.

The base plate 41 has a shape of a case having a predetermined internal space. In the internal space, a pipe line for supplying the fuel to the electricity generators 21 of the fuel cell main body 20 and various components for managing non-reacted fuel and air, carbon dioxide, water, and heat may be included.

Moreover, the base plate 41 may include additional electricity managing means for managing electricity generators 21 of the fuel cell main body 20 and electrical energy that is generated by the electricity generators 21, and a connection terminal for electrically connecting the electronic device 100.

In addition, the base plate 41 includes a fuel tank for storing the fuel. The fuel tank 30 is constructed to be accommodated into an accommodating portion 45 formed in the base plate 41.

More specifically, the accommodating portion 45 formed in the base plate 41 is provided with a hollow portion 45*a* having a shape corresponding to the outer appearance of the fuel tank 30, and the fuel tank 30 is accommodated into the hollow portion 45*a*. The accommodating portion 45 may be formed in a direction perpendicular to the supporting block 43.

In the current embodiment, the fuel tank 30 may be separable from the accommodating portion 45 and is constructed in a cartridge type so as to fill with the fuel. In addition, the fuel tank 30 may be connected to the electricity generators 21 of the fuel cell main body 20 by the aforementioned pipe line in a state when accommodated into the accommodating portion 45.

The supporting block 43 has a predetermined internal space and is disposed in a direction perpendicular to the disposed direction of the base plate 41. The supporting block 43 has a function of stably maintaining a standing state of the fuel cell system 90 and the electronic device main body 10 when the fuel cell main body 20 and the mount member 40 have a relative rotation therebetween.

The internal space of the supporting block 43 may include an inverter and converter for controlling a voltage level of a power output from the electricity generators 21 of the fuel cell main body 20, or a controller (not shown) for providing and processing control signals needed to generally drive the system.

In addition, the internal space of the supporting block 43 includes a fuel pump 50 for discharging the fuel stored in the fuel tank 30 under a predetermined pumping pressure and supplying the fuel to the electricity generators 21 of the fuel cell main body 20. The fuel pump 50 is connected to the fuel tank 30 by the pipe line, and more preferably, the fuel pump 50 may be disposed closely to the fuel tank 30.

In the current embodiment, the hinge portion 60 is constructed to allow the fuel cell main body 20 and the mount member 40 to have a relative rotation therebetween. An upper portion of the fuel cell main body 20 is hinged to an upper portion of the mount member 40.

The hinge portion 60 is provided with a hinge axis 61 so that the fuel cell main body 20 is rotated from the mount member 60 at a predetermined angle. The upper portion of the fuel cell main body 20 is hinged to the upper portion of the mount member 40 by the hinge axis 61 on the same axis. In this case, the rotation angle between the fuel cell main body 20 and the mount member 40 may be substantially 45°.

Here, the hinge portion 60 may have a structure in which the pipe line for connecting the fuel cell main body 20 to the fuel tank 30 and lead wires for electrically connecting the electricity generators 21 of the fuel cell main body 20 to the controller can easily pass.

In addition, the hinge portion 60 may include a conventional on-off switch for selectively turn on or turn off an operation of the fuel cell system 90 according to a relative rotation between the fuel cell main body 20 and the electronic device main body 10.

Operations of the electronic device which is constructed as described above according to the embodiment of the present invention will described in detail.

First, the mount member 40 loads the electronic main body 10 thereon, and in a state where the fuel cell main body 20 and the mount member 40 are folded, the fuel cell main body 20 or the mount member 40 is turned on the hinge portion 60. In this case, the fuel cell main body 20 maintains a rotation angle of substantially 45° with respect to the mount member 40, and of which both sides are exposed in the atmosphere.

Thereafter, normal operations of the fuel cell system 90 are performed, and the electronic device main body 10 drives. More specifically, the fuel pump 50 discharges the fuel stored in the fuel tank 30 and supplies the fuel to the electricity generators 21 of the fuel cell main body 20. The anode portion 21*b* of the electricity generators 21 then distributes the fuel to the first electrode layer of the MEA 21*a*.

At the same time, while the both sides of the fuel cell main body 20 are exposed in atmosphere, the air in the atmosphere passes through the air vents 23*a* of the case 23 by diffusion or convection so as to be supplied to the electricity generators 21. The cathode portions 21*c* of the electricity generators then distribute the air to the second electrode layer pf the MEA 21*a*.

Thereafter, the electricity generators 21 generate predetermined electrical energy of a predetermined magnitude by an oxidation reaction of the fuel through the first electrode layer of the MEA 21*a* and by a reduction reaction of oxygen through the second electrode layer of the MEA 21*a*, and output the electrical energy to the electronic device main body 10.

Accordingly, the electronic device main body 10 can be driven by being supplied with the electrical energy as a main power source, and electronic device 100 maintains a stable sanding state by a relative rotation structure of the electronic main body 10 and the fuel cell main body 20.

In other words, the electronic device main body 10 is supported by the fuel cell main body 20 to maintain a stable standing state, and the user can watch moving images and execute games and information using the electronic device main body 10 in a comfortable position.

Here, when the electronic device main body 10 or the fuel cell main body 20 is turned on the hinge portion 60 such that the mount member 40 and the fuel cell main body 20 are folded again, the operations of the fuel cell system 90 stop and the electronic device main body 10 is tuned off.

Figure 6:
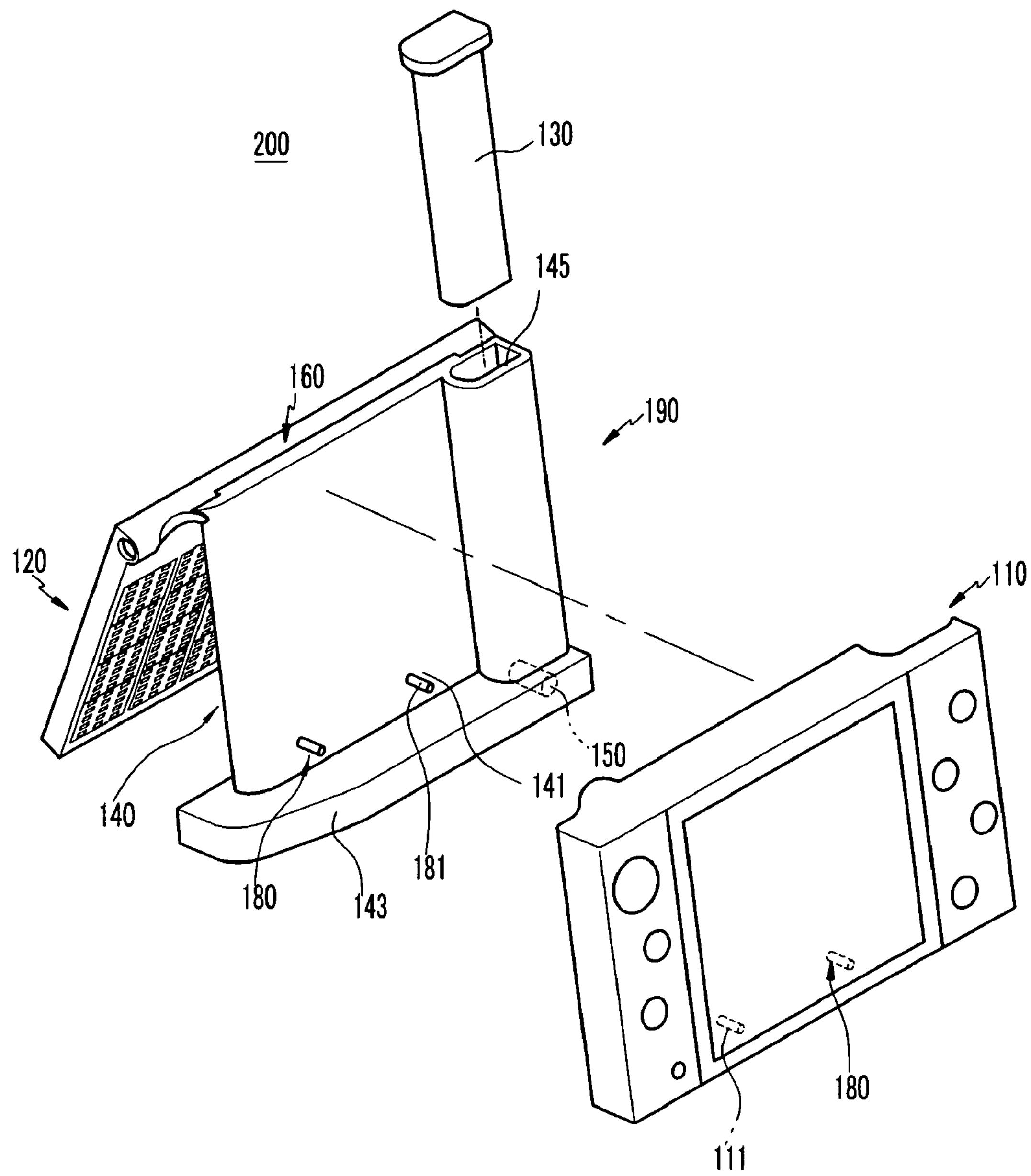
FIG. 6 is an exploded perspective view showing an electronic device according to a second embodiment of the present invention.
Figure 7:
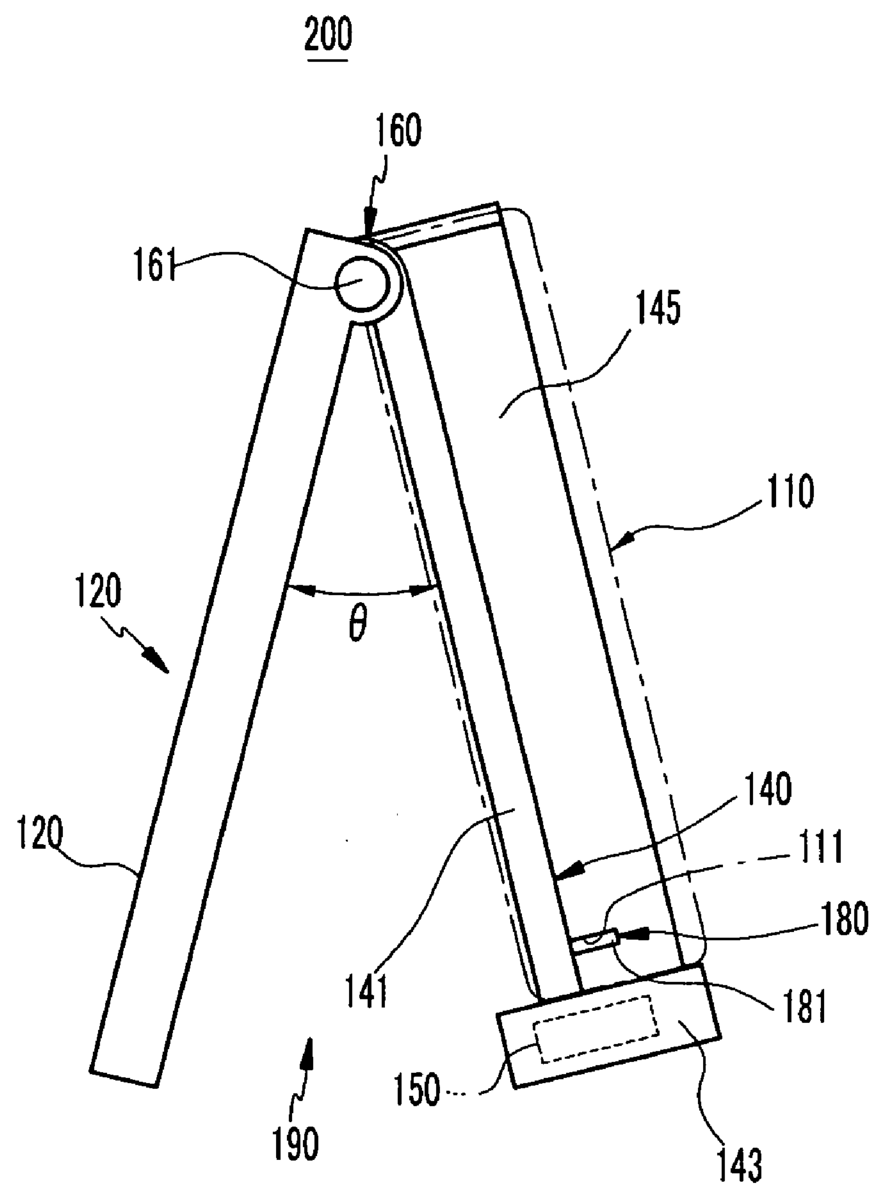
FIG. 7 is a side view showing the electronic device shown in FIG. 6.

FIG. 6 is an exploded perspective view showing the electronic device according to a second embodiment of the present invention. FIG. 7 is a side view showing the electronic device shown in FIG. 6.

Referring to FIGS. 6 and 7, an electronic device 200 according to a second embodiment has basically the same structure as that of the aforementioned electronic device 100 in the first embodiment. Particularly, in the second embodiment, the electronic device 200 includes a fuel cell system 190 which is constructed to be detachable from an electronic device main body 110.

In the second embodiment, the fuel cell system 190 includes a fuel cell main body 120, a mount member 140 which loads the electronic device main body 110, a hinge portion 160 by which the fuel cell main body 120 is hinged to the mount member 140 such that the fuel cell main body 120 and the mount member 140 have a relative rotation, a detaching member 180 by which the electronic device main body 100 can be selectively detached from the mount member 140.

Since abase plate 141 of the mount member 140, a supporting block 143, a fuel tank 130 and accommodating portion 145 thereof, and a fuel pump 150 as well as the electronic device main body 110, the fuel cell main body 120, the mount member 140, the hinge portion 160 according to the current embodiment have the same structures as those in the first embodiment, detailed description thereof is omitted.

Here, the detaching member 180 is used to allow the electronic device main body 110 to be detached from the mount member 140 according to the selection of the user. The detaching member 180 according to the second embodiment includes one or more first engaging protrusions 181 formed on the base plate 141 of the mount member 140 and first engaged notches 111 formed to correspond to the first engaging protrusions 181 in the electronic device main body 110.

The first engaging protrusions 181 protrude from the base plate 141, and a plurality of the first engaging protrusions 181 may be provided to the edge portion of the base plate 141.

The first engaged notches 111 are formed at the back of the electronic device main body 110 in order to correspond to the first engaging protrusions 181. The first engaged notches 111 are formed in such a shape that the first engaged notches are engaged with the first engaging protrusions 181 at the package of the electronic device main body 110.

Here, the first engaging protrusions 181 are forcibly engaged with the first engaged notches 111 to be easily fitted thereto by male and female connection. Therefore, the first engaging protrusions 181 are formed in a round shape such that the first engaging protrusions 181 are easily disengaged from the first engaged notches 111, and the first engaged notches 111 are also formed in a round shape corresponding to the shape of the first engaging protrusions 181.

According to the electronic device 200 having the aforementioned construction according to the second embodiment of the present invention, in a state where the fuel cell main body 120 and the mount member 140 are folded each other, the electronic device main body 111 is engaged with the first engaging protrusions 181 of the mount member 140.

In this case, since the electronic device main body 110 is provided with the first engaged notches 111 at the package thereof, the first engaging protrusions 181 are forcibly engaged with the first engaged notches 111 to be fitted thereto by male and female connection. Therefore, the electronic device main body 110 is firmly fixed to the mount member 140.

In this state, the fuel cell main body 120 or the mount member 140 is turned on the hinge portion 160. In this case, the fuel cell main body 120 maintains a rotation angle of substantially 45° with respect to the mount member 140, and of which both sides are exposed in the atmosphere.

When an external force is exerted on the electronic device main body 110 in a direction opposite to an engaged direction of the electronic device main body 110 by the user, the first engaging protrusions 181 are separated from the first engaged notches 111 so that the electronic device main body 110 is disengaged from the mount member 140.

Since other operations of the portable electronic device 200 according to the current embodiment of the present invention are same as those in the aforementioned embodiment, detailed description is omitted.

Figure 8:
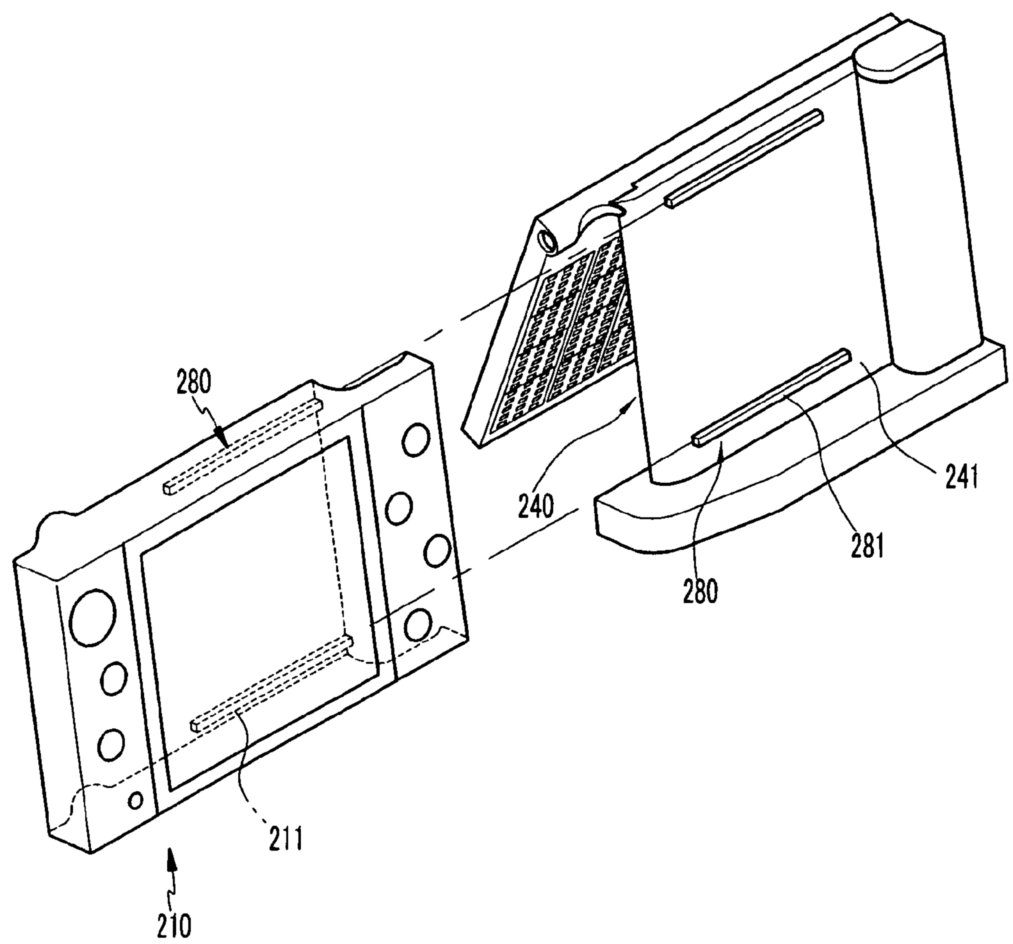
FIG. 8 is an exploded perspective view showing an electronic device according to a third embodiment of the present invention.

FIG. 8 is an exploded perspective view showing a structure of an electronic device according to a third embodiment of the present invention.

Referring to FIG. 8, an electronic device 300 according to a third embodiment has basically the same structure as that of the aforementioned electronic device 200 in the second embodiment. Particularly, in the third embodiment, the electronic device 300 may include a detaching member 280 for detaching an electronic device main body 210 from a mount member 240 in a sliding manner.

The detaching member 280 includes one or more second engaging protrusions 281 formed on a base plate 241 of the mount member 240 and engaged notches 211 formed to correspond to the second engaging protrusions 281 in the electronic device main body 210.

The second engaging protrusions 281 are formed to have a long shape in a longitudinal direction of the base plate 241. In the third embodiment, a couple of the second engaging protrusions protrude from the upper and lower edge portions if the base plate 241 and formed in a parallel direction with each other along the longitudinal direction of the base plate 241. In this case, the second engaging protrusions 281 may be formed to have a rail shape such that the second engaging protrusions 281 are detached from the second engaged notches 211 of the electronic device main body 210 with sliding.

The aforementioned second engaged notches 211 are formed at the back of the electronic device main body 210 corresponding to the second engaging protrusions 281. Therefore, the second engaging protrusions 281 are engaged with or disengaged from the package portion of the electronic device main body 210 with sliding.

Accordingly, in the portable electronic device 300 according to the current embodiment, the electronic device main body 210 is detachable from the mount member 240 by the second engaging protrusions 281 formed on the mount member 240 and the second engaged notches 211 formed in the electronic device main body 210 with sliding.

Since other components and operations of the portable electronic device 300 according to the current embodiment of the present invention are same as those in the aforementioned embodiment, detailed description is omitted.

Figure 9:
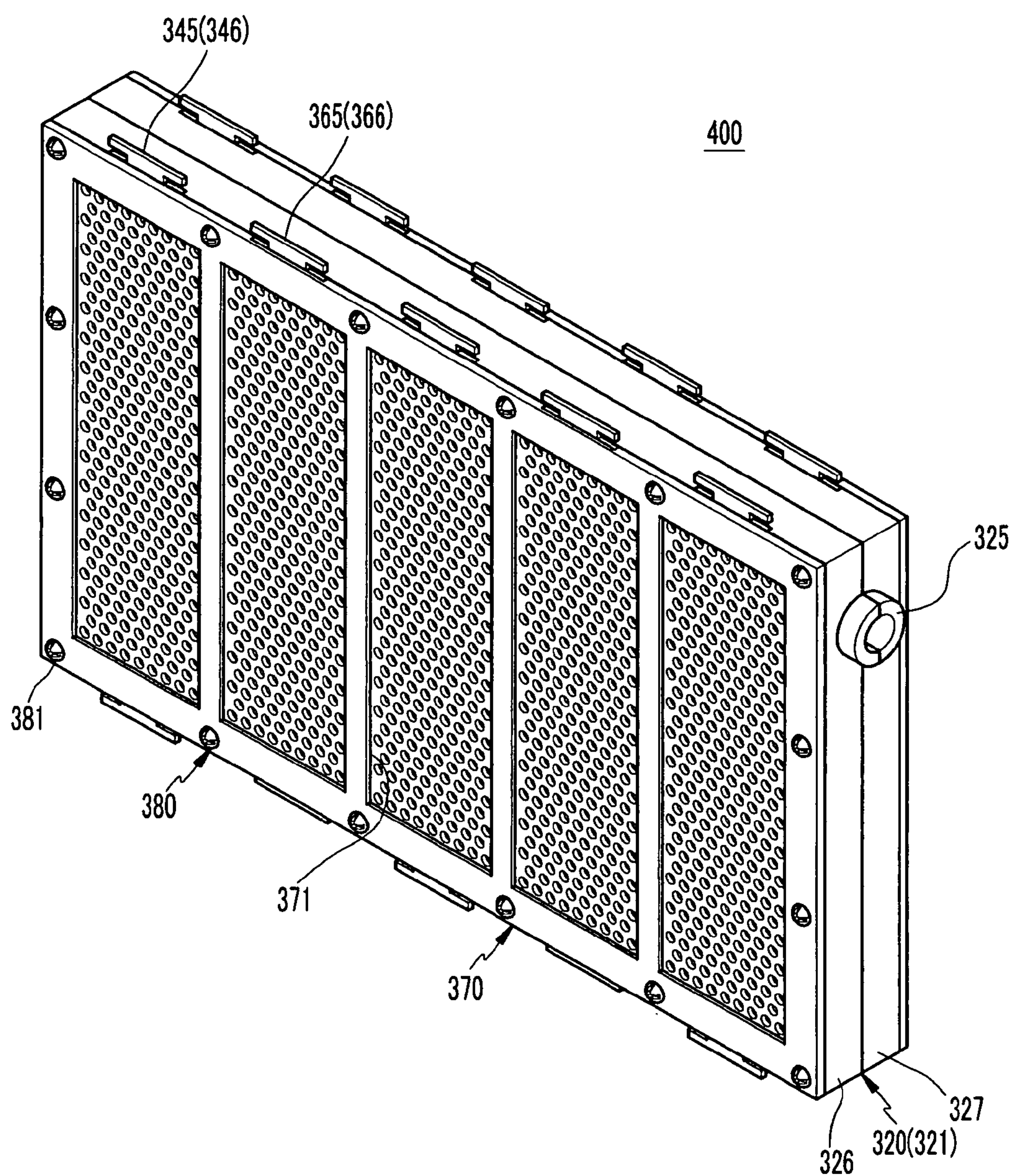
FIG. 9 is a perspective view showing a fuel cell main body according to a fourth embodiment of the present invention.
Figure 10:
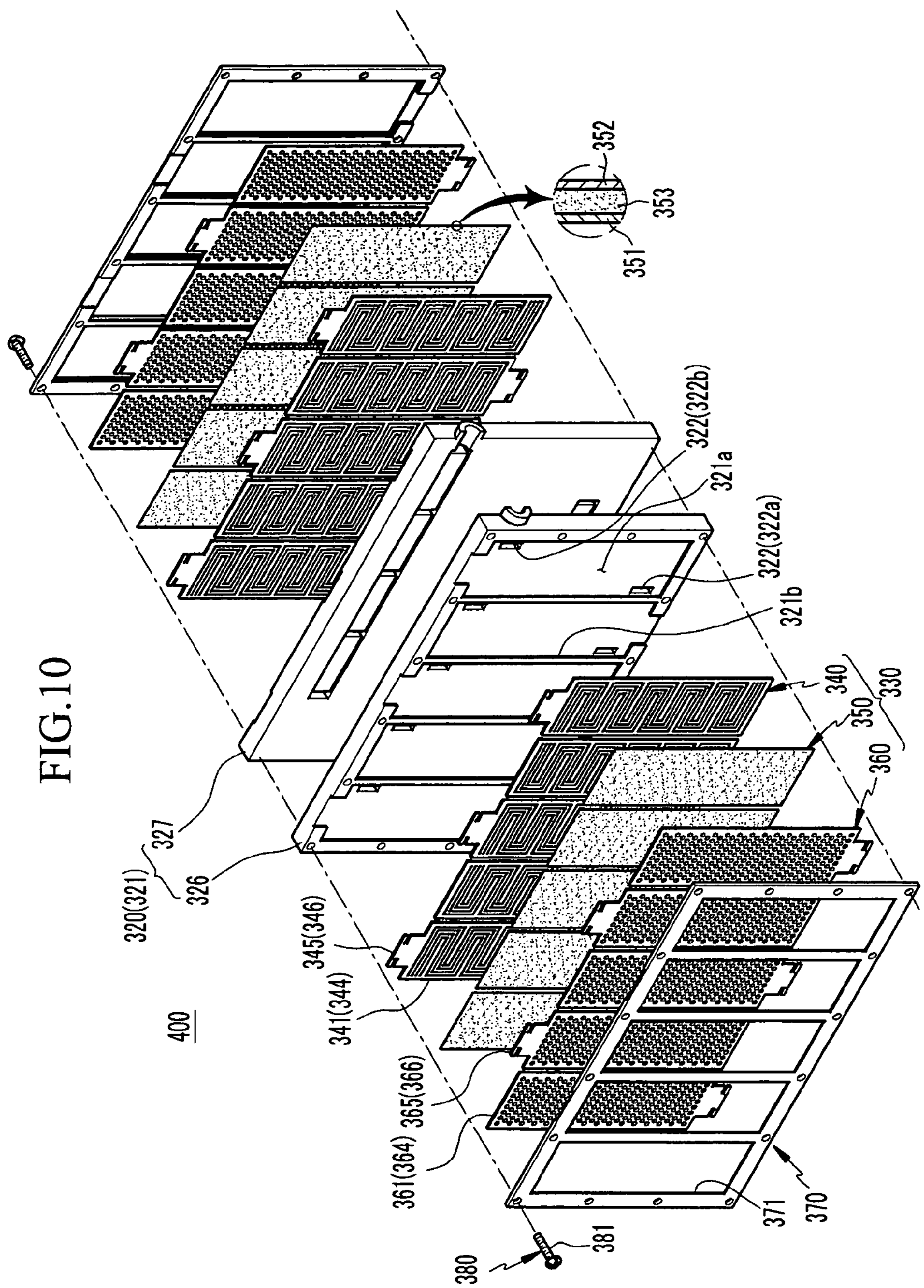
FIG. 10 is an exploded perspective view showing the fuel cell main body shown in FIG. 9.

FIG. 9 is a perspective view showing a fuel cell main body of a fuel cell system according to a fourth embodiment of the present invention. FIG. 10 is an exploded perspective view showing the fuel cell main body shown in FIG. 9.

Referring to FIGS. 9 and 10, a fuel cell main body 400 according to a fourth embodiment includes a separator 320 and a plurality of electricity generators 330 formed at the both sides of the separator 320 which is disposed between the electricity generators 330 to correspond to each other.

The separator 320 has a function of partitioning the electricity generators 330 formed at the both sides thereof. The separator 320 has an insulating property where electricity is prevented from flowing and includes a medium member 320 having a plate type capable of allowing the fuel to flow to the both sides thereof. A structure of the medium member 321 will be further described later with reference to FIGS. 11 and 12.

The aforementioned electricity generators 330 are disposed at both sides of the medium member 321 at predetermined intervals therefrom. The electricity generators 330 constitute a fuel cell in units of a cell for generating electrical energy by a reaction of the fuel and the air. The electricity generators 330 includes anode portions 340 disposed in close contact with the both sides of the medium member 321, MEAs 350 disposed in close contact with the corresponding anode portions 340, and cathode portions 360 disposed in close contact with the corresponding MEAs 350.

In the fourth embodiment, the medium member 321 has a shape of a rectangular of which short side is shorter than a long side thereof.

Figure 11:
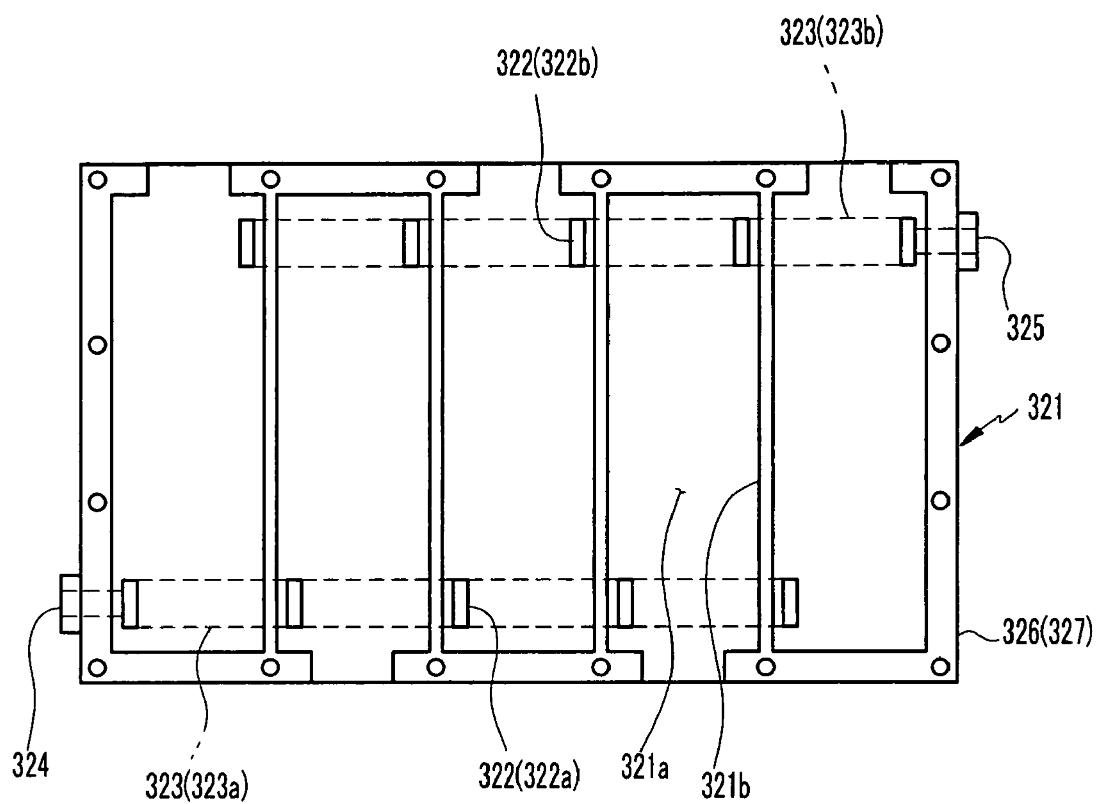
FIG. 11 is a front view showing a medium member of a fuel cell main body according to a fourth embodiment of the present invention.

As shown in FIG. 11, a plurality of unit areas 321*a* are formed on the both sides of the medium member 321. The unit areas 321*a* are sequentially formed on the both sides of the medium member 321 at predetermined internals therefrom.

The unit area 321*a* is provided with a manifold 322 which allows the fuel to flow to the anode portion 340 which will be further described later. In addition, the inside of the medium member 321 is provided with a fuel pathway 323 which is connected to the manifold 322.

The aforementioned unit area 321*a* is a section where a cell unit of the electricity generator 330 is disposed, and represents an active area where a reaction of the fuel and the air occurs.

The unit areas 321*a* are formed on the both sides of the medium member 321 in a direction of the short side thereof, and are partitioned by a predetermined interval in a direction of the long side thereof. The unit cells are partitioned by engaged notches 321*b* for engaged with the anode portion 340 that will be further described later.

More specifically, portions excluding the engaged notches 321*b* in the both sides of the medium member 321 protrude. Therefore, the unit area 321*a* may be a space inside the protruded portions.

The fuel pathway 323 is formed inside the medium member 321 in the direction of the long side. The fuel pathway 323 includes a first pathway 323*a* through which the fuel supplied by fuel supply device flows and a second pathway 323*b* through which the fuel passed through the anode portion 40 flows.

In this case, the first pathway 323*a* is formed along the lower edge portion of the medium member 321. The second pathway 323*b* is formed along the upper edge portion of the medium member 321 in a parallel direction with the first pathway 323*a*.

In the current embodiment, the manifold 322 is formed in each unit area 321*a* of the medium member 321. The manifold 322 is provided with an outlet 322*a* connected to the first pathway 323*a* of the fuel pathway 323 and an inlet 322*b* connected to the second pathway 323*b* thereof.

Here, the outlet 322*a* allows the fuel passing through the first pathway 323*a* to flow out to a flowpath of the anode portion 340 that will be further described later. The inlet 322*b* allows the fuel passing through the anode portion 340 to flow into the second pathway 323*b*.

In addition, the medium member 321 is provided with a fuel injecting portion 324 that is used to inject the fuel at an end portion thereof and a fuel discharging portion 325 that is used to discharge the fuel passing through the second pathway 323*b* at the other end portion thereof. In this case, the fuel injecting portion 324 may be connected to a fuel pump through a conventional pipeline.

Figure 12:
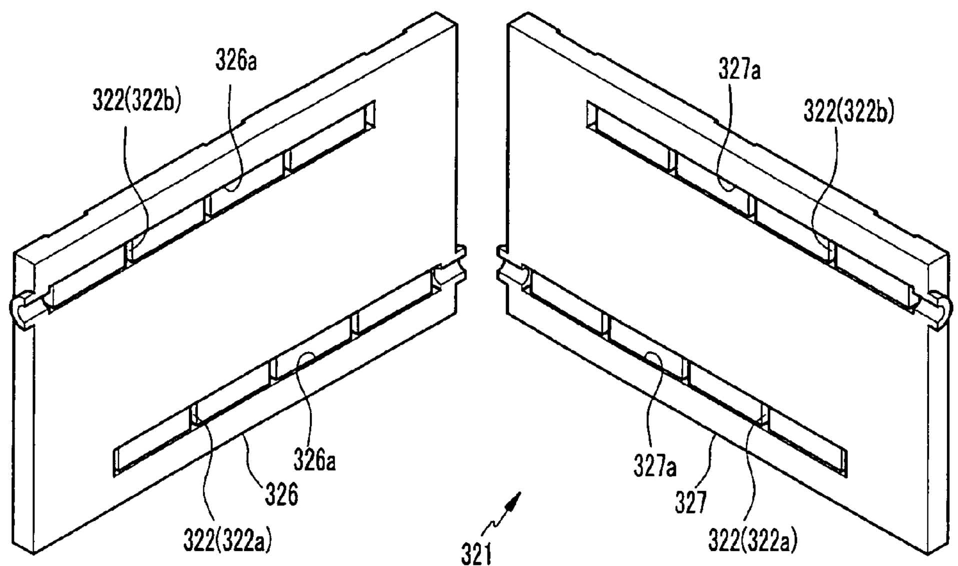
FIG. 12 is an exploded perspective view showing the medium member shown in FIG. 11.

The medium member 321 having the aforementioned construction is divided into two parts, that is, a first portion 326 and a second portion 327 as shown in FIG. 12. The first portion 326 and the second portion 327 are attached in one body to form the fuel pathway 323 as shown in FIG. 11. More specifically, the first pathway 323*a* of the fuel pathway 323 and a first notch 326*a* corresponding to the second pathway 323*b* are formed at a one side of the first portion 326. In addition, the first pathway 323*a* of the fuel pathway 323 and a second notch 327*a* corresponding to the second pathway 323*b* are formed at a one side of the second portion 327. Here, the plurality of unit areas 321*a* described above are formed at the other sides of the first and second portions 326 and 327.

Therefore, the one sides of the first and second portions 326 and 327 of the medium member 321 according to the current embodiment are integrated with each other while facing each other to form the fuel pathway 323 therebetween.

Hereinafter, a structure of the electricity generators 330 which are disposed at both sides of the medium member 321 at predetermined intervals therefrom are will be described in detail with reference to FIGS. 9 and 10.

The electricity generator 330 includes an MEA 350, an anode portion 340 and a cathode portion 360 which are disposed in close contact with the both sides of the MEA 350 interposed therebetween.

Here, a first electrode layer (anode) 351 is formed on a one side of the MEA 350, a second electrode layer (cathode) 352 is formed one the other side of the MEA 350, and an electrolyte membrane 353 is formed between the two electrode layers 351 and 352, thereby constituting the conventional MEA.

Here, in the first electrode layer 351 hydrogen contained in the fuel is decomposed into electrons and hydrogen ions, in the electrolyte membrane 353, the hydrogen ions moves to the second electrode layer 352, and in the second electrode layer, the electrons and hydrogen ions supplied from the first electrode layer 351 are reacted with oxygen supplied additionally to generate water and heat.

In the current embodiment, the MEA 350 has a size corresponding to the anode and cathode portions 340 and 360 and may include a conventional gasket (not shown) at the edge portion thereof.

The anode portion 340 closely contacts the first electrode layer 351 of the MEA 350 and is disposed at each unit area 321 a while maintaining predetermined intervals from the both sides of the medium member 321.

In the anode portion 340, the fuel is circulated and distributed to be supplied to the first electrode layer 351 of the MEA 350. In addition, the anode portion 340 has a function of a conductor such that electrons decomposed from the hydrogen contained in the fuel are moved to the adjacent cathode portion 360 of the electricity generator 330 by the first electrode layer 351.

Therefore, the anode portion 340 includes a first flowpath 342 through which the fuel is circulated and a first path member 341 disposed at each unit area 321*a* of the medium member 321.

The first path member 341 is constructed with a metal plate having a conductivity, has a size corresponding to the MEA 350, and engaged with the engaged notch 321*b* of the unit area 321*a*.

In the current embodiment, the first path member 341 has a function of a conductor such that electrons move to the adjacent cathode portion 360 of the electricity generator 330 as described above. Therefore, the first path member 341 is constructed as a current collector 344 for collecting currents having the opposite polarity to that of the cathode portion 360.

Therefore, the first path member 341 is provided with a terminal portion 345 which is electrically connected to the adjacent cathode portion 360 of the electricity generator 330 through lead wires.

The terminal portion 345 is integrated into the first path member 341 in one body and includes a protrusion 346 extending outwardly from the edge portion of the medium member 321. In this case, the protrusion 346 protrudes from an end portion of the path member 341, and the corresponding protrusion is also provided to a corresponding end portion of the adjacent first path member to be aligned with the protrusion 346.

Here, the first flowpath 342 is constructed as a plurality of flowpaths 343 for connecting the manifold 322, that is, the outlet 322*a* and the inlet 322*b* formed in the unit area 321*a* in order to flow fuels injected through the first pathway 323*a*.

The first flowpaths 342 are constructed as holes penetrating the plate of the first path member 341, as more preferably, are formed in a straight line at a predetermined interval therebetween along the longitudinal direction of the first path member 341, and of which end portions are connected in alternate position so as to be formed to have a shape of a meander. In this case, the first path member 341 are engaged with the engaged notch 321*b* of the unit area 321*a*, so that an end portion of the first flowpath 342 is connected to the outlet 322*a* of the manifold 322 and the other end portion is connected to the inlet 322*b* of the manifold 322.

In the current embodiment, the cathode portion 360 closely contacts the second electrode layer 352 of the MEA 350, and is engaged with an end plate 370 which will be further described later at a predetermined interval therefrom.

In the cathode portion 360, the air in the atmosphere flows by diffusion or convection of the air such that the air are distributed and supplied to the second electrode layer 352 of the MEA 350. In addition, the cathode portion 360 has a function of a conductor such that the cathode portion 360 can be supplied with electrons from the anode portion 340 of the electricity generator 330.

Therefore, the cathode portion 360 is constructed with a metal plate having a conductivity, and includes a second path member 361 having a second flowpath 362 in order to distribute the air, to the second electrode layer 352 of the MEA 350.

In this case, the second path member 361 has a size corresponding to the first path member 341 and the MEA 350. In addition, the second flowpaths 362 are constructed as holes penetrating the plate, and more preferably, include a plurality of air vents 363 at the entire plate.

In addition, the second path member 361 has a function of a conductor such that the second path member 361 is supplied with electrons from the adjacent anode portion 360 of the electricity generator 330 as described above. Therefore, the second path member 361 is constructed as a current collector 364 for collecting currents having the opposite polarity to that of the anode portion 360.

The second path member 361 includes a terminal portion 365 which is electrically connected to the adjacent anode portion 340 of the electricity generator 330, that is, the terminal portion 345 of the first path member 341.

The terminal portion 365 is integrated into the second path member 361 in one body and includes a protrusion 366 extending outwardly from the edge portion of the medium member 321.

Here, the protrusion 366 protrudes from an end portion of the path member 361, and the corresponding protrusion is also provided to a corresponding end portion of the adjacent second path member to be aligned with the protrusion 366. In addition, the protrusions 366 of the second path members 361 and the protrusions 346 of the first path members 341 are alternately disposed in the longitudinal direction of the medium member 321.

In the fuel cell main body 400 according to the current embodiment, the second path members 361 of the cathode portion 340 are fixed to the both sides of the medium member 321, and at the same time, the fuel cell main body 400 includes an end plate 370 in order to allow the second path member 361 to be firmly attached to the MEA 350.

The end plate 370 includes an opening 371 so as to expose the second path member 361 to the atmosphere. The opening 371 has a size corresponding to that of the second path member 361.

Figure 13:
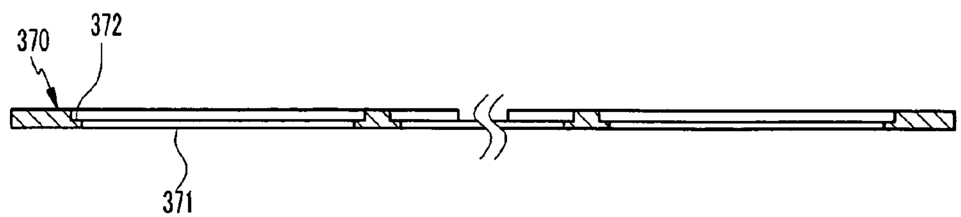
FIG. 13 is a sectional view showing an end plate of a fuel cell main body according to a fourth embodiment of the present invention.

In addition, the end plate 370 further includes a snag 372 which is formed near the edge portion of the opening 371 as shown in FIG. 13. The snag 372 has a thickness corresponding to that of the second path member 361 such that the position of the second path member 361 is fixed. In addition, the snag 372 presses the edge portions of the second path member 361 such that the second path member 361 is closely contacted with the MEA 350.

In the current embodiment, each end plate 370 is integrated into the medium member 321 in one body by a plurality of tightening members 380.

The tightening members 380 include conventional tightening bolts 381 penetrating a portion in the end plate 370 excluding the opening 371 to be tightened with an area in the medium member 321 excluding the unit area 321*a*.

A manufacturing process of the fuel cell main body 400 having the aforementioned construction according to the fourth embodiment of the present invention is described. First, the first path member 341 is fitted to the unit area 321 a of the medium member 321.

Here, the first members 341 maintain predetermined intervals from the both sides of the medium member 321 and engaged with the engaged notches 321*b*, so that a one side of the first path member 341 is closely contacted with the inner surface of the unit area 321*a*.

In this state, the first electrode layer 351 of the MEA 350 is disposed in a close contact with the other side of the first path member 341. Here, the gasket (not shown) formed near the edge portion of the MEA 350 may be disposed on the protruding portion (a portion excluding the unit area) formed at the both sides of the medium member 321 and disposed to contact the other side of the first path member 341.

Next, the second path members 361 are fixed to the openings 371 of the end plate 370. More specifically, the second path member 361 is engaged with the snag 372 formed near the edge portion of the opening 371 so as to maintain a fixed state.

Next, the end plate 370 is disposed to contact the protruding portion of the medium member 321. In this case, the second path member 361 contacts the second electrode layer 352 of the MEA 350.

Next, the tightening member 380 penetrates a portion in the end plate 370 excluding the opening 371 to be tightened with a protruding portion of the medium member 321, that is, an area in the medium member 321 excluding the unit area 321*a*. The end plate 370 is then tightened with the medium member 321 by the tightening member 380, so that the end plate 370 presses the edge portion of the second path member 361 and the second path member 361 is closely contacted with the second electrode layer 352 of the MEA 350.

Accordingly, the manufacturing the fuel cell main body 400 according to the fourth embodiment is completed through the aforementioned process. The fuel cell main body

400 is rotated with respect to the aforementioned electronic device main body, so that the air vents 363 of the second path member 361 included in the cathode portion 360 of each electricity generator 330 are exposed to the atmosphere.

The fuel cell main body 400 may also be accommodated into an additional case (not shown). In this case, the case is provided with a plurality of holes at both sides thereof. As a result, the air vents 363 of the second path member 361 included in the cathode portion 360 of the electricity generator 330 are exposed to the atmosphere.

According to the present invention as described above, the air is provided through the both sides of the fuel cell main body, and the fuel cell main body is rotated with respect to the electronic device in a folded structure. Therefore, stability against a temperature increase can be guaranteed by the fuel cell main body, and the output of electrical energy can be maximized. In addition, the electronic device is portable and easily used by a user without regard to the circumference.

In addition, the fuel cell main body can be fixed to or detachable from the electronic device main body, and electrical energy generated in the fuel cell main body is used as a main power source. Therefore, the electronic device main body is portable and easily used with the fuel cell system by a user without regard to the circumference.

Although the exemplary embodiments and the modified examples of the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

What is claimed is:

1. An electronic device comprising:
- an electronic device main body;
- a fuel cell main body having an electricity generator to generate electrical energy and rotatable with respect to the electronic device main body;
- a mount member to support the electronic main body thereon;
- a hinge portion hinging the fuel cell main body to the electronic main body; and
- a fuel tank arranged within the mount member to store fuel.

2. The electronic device of claim 1, wherein the mount member is integrated into the electronic device main body in one body.

3. The electronic device of claim 1, wherein the mount member is separable from the electronic main body.

4. The electronic device of claim 1, wherein the mount member comprises an accommodating portion to accommodate the fuel tank.

5. The electronic device of claim 4, wherein the fuel tank is detachable from the accommodating portion.

6. The electronic device of claim 1, further comprising a fuel pump disposed in the mount member to supply the fuel stored in the fuel tank to the electricity generator.

7. The electronic device of claim 1, wherein the fuel cell main body has a shape of a substantially rectangular flat board.

8. The electronic device of claim 3, wherein the electronic device main body is detachable from the mount member.

9. An electronic device comprising:
- an electronic device main body; and
- a fuel cell main body having an electricity generator to generate electrical energy and rotatable with respect to the electronic device main body and a hinge portion hinging the fuel cell main body to the electronic main body, the electricity generator including:
  - first and second electrode layers and an electrolyte membrane interposed between the first and second electrode layers;
  - an anode portion corresponding to the first electrode layer;
  - a cathode portion corresponding to the second electrode layer;
  - a mount member to support the electronic main body thereon; and
  - a fuel tank arranged within the mount member to store fuel.

10. The electronic device of claim 9, wherein the mount member is integrated into the electronic device main body in one body.

11. The electronic device of claim 9, wherein the mount member is separable from the electronic device main body.

12. The electronic device of claim 9, wherein the mount member comprises an accommodating portion to accommodate the fuel tank.

13. The electronic device of claim 12, wherein the fuel tank is detachable from the accommodating portion.

14. The electronic device of claim 9, further comprising a fuel pump disposed in the mount member to supply the fuel stored in the fuel tank to the electricity generator.

15. The electronic device of claim 9, wherein the fuel cell main body has a shape of a substantially rectangular flat board.

16. The electronic device of claim 11, wherein the electronic device main body is detachable from the mount member.

17. The electronic device of claim 9, wherein the electronic generator comprises one or more pairs of MEAs (membrane-electrode assemblies) with a medium member between each pair of MEAs, and
- wherein each MEA includes an anode, an electrolyte membrane, and a cathode sequentially disposed from the medium member.

18. The electronic device of claim 9, wherein the fuel cell main body comprises a case provided with a plurality of air vents and accommodating the electricity generator.

19. The electronic device of claim 18, wherein the case accommodates a pair of electricity generators facing each other.

20. The electronic device of claim 19, wherein the cathode of each electricity generator is disposed in the case to face one side of the case.

* * * * *